United States Patent [19]

Gurcan et al.

[11] Patent Number: 5,050,186
[45] Date of Patent: Sep. 17, 1991

[54] SIGNAL EQUALIZING ARRANGEMENT AND A METHOD OF EQUALIZING A RECEIVED DATA SIGNAL

[75] Inventors: Mustafa K. Gurcan, Crawley; Timothy J. Moulsley, Caterham, both of England

[73] Assignee: U.S. Philips Corp., New York, N.Y.

[21] Appl. No.: 293,169

[22] Filed: Jan. 4, 1989

[30] Foreign Application Priority Data

Jan. 8, 1988 [GB] United Kingdom ................. 8800386

[51] Int. Cl.$^5$ ............................................ H04B 3/04
[52] U.S. Cl. ...................................... 375/14; 375/12; 333/18; 364/724.2
[58] Field of Search ...................... 375/12, 14; 333/18; 364/724.2, 724.16; 377/68, 69, 76

[56] References Cited

U.S. PATENT DOCUMENTS 4,747,068  5/1988  Voorman et al. ................. 364/724.2
4,872,184 10/1989  Yamaguchi et al. ................... 375/14

FOREIGN PATENT DOCUMENTS 0146979  7/1985  European Pat. Off. .............. 375/14
0127433  7/1984  Japan ..................................... 375/14

OTHER PUBLICATIONS

"Linear Recursive Adaptive Equalizers", B. A. Cochran et al., IEEE, New York, pp. 263-272.
"Baseband Equalizer Performance in the Presence of Selective Fading", H. Sari, IEEE, New York, pp. 1.1.1-1.1.7.
"Timing Recovery in Digital Synchronous Data Receivers", K. Mueller, IEEE Transactions on Communications, vol. Com. -24, No. 5, May 1976, pp. 516-531.
"Optimum Mean-Square Decision Feedback Equalisation", The Bell System Technical Journal, Oct. 1973, pp. 1341-1373.

Primary Examiner—Douglas W. Olms
Assistant Examiner—Ralph Smith
Attorney, Agent, or Firm—Jack D. Slobod

[57] ABSTRACT

A signal equalizing arrangement comprises a decision feedback equalizer formed by a feedforward filter section (16) connected to a feedback filter section (18) which includes a decision stage (20). If the performance of the equalizing arrangement as determined by the signal to noise ratio versus the bit error rate is found to be below the calculated optimum performance of the decision feedback equalizer, then an improved performance may be obtained by operating the equalizer in a time reverse mode. In order to operate the equalizer in a time reverse mode, a first last-in, first-out store (60) is connected in the signal path to the feedforward filter section (16) and a second last-in, first-out store (62) is connected to the output of the decision stage (20).

14 Claims, 3 Drawing Sheets

SIGNAL EQUALIZING ARRANGEMENT AND A METHOD OF EQUALIZING A RECEIVED DATA SIGNAL

BACKGROUND OF THE INVENTION

The present invention relates to a signal equalising arrangement and to a method of equalising a received data signal and has particular but not exclusive application in the transmission of data or digitised signals over radio channels. For convenience of description in the present specification digitised signals will be referred to as data.

The problem of intersymbol interference resulting from transmission of data on dispersive communication channels is known and in order to estimate correctly the data in the received channel, this signal is applied to a signal equaliser. Known signal equalisers are linear equalisers (LEs) which essentially are feedforward digital filters, decision feedback equalisers (DFEs) which essentially are a combination of a feedforward filter and a feedback (or recursive) filter including a decision stage, and Viterbi equalisers in which a received signal is compared with signatures stored in a memory bank and the best match is obtained. The present invention is particularly applicable to DFEs.

When operating a DFE, data is normally processed in the order in which it is received. The tap weights used in the feedforward and feedback filter sections are determined in dependence on the channel impulse response (CIR). The CIR may be substantially constant for communication channels such as telephone cables but may be variable in mobile (including portable) radio applications in which it may be necessary to recalculate the tap weights to suit the changing CIR. Another factor which has an influence on the performance of a DFE, expressed in terms of signal to noise ratio (SNR) versus bit error rate (BER), is the choice of the reference tap position.

In the present specification the expression reference tap and reference tap position are to be understood as meaning a synchronisation marker between the transmitter and the receiver. The reference tap position serves to compensate for the time delays occurring between the instant of transmission of a currently detected symbol and the instant a decision is made to estimate the symbols.

K. H. Mueller and M. Muller in an article "Timing Recovery in Digital Synchronous Data Receivers" IEEE Transactions on Communications Vol. Com.-24, No. 5, May 1976 pages 516 to 531 reported that in their opinion the energy in received signal samples can be maximised with respect to noise by adjusting a receiver clock until the clocking point is aligned with the peak of the impulse response of the channel. Consequently it has been customary when operating DFE's on telephone channels to synchronise the reference tap of the DFE to the peak of the impulse response.

H. Sari in an article entitled "Baseband Equaliser Performance in the Presence of Selective Fading" published by the IEEE Global Telecommunications Conference Proceedings 1983 pages 111 to 117 discusses LEs and DFEs and mentions that tap-gain optimisation in baseband equalisers is usually carried out by fixing the position of the reference tap (RTP) and then minimising the output mean square error (MSE) for that fixed RTP. Sari shows that by making the position of the reference tap adaptive, a considerable performance improvement can be achieved in both equaliser structures and especially in DFEs. In order to achieve RTP adaption Sari proposes the use of a second (or slave) equaliser for estimating the optimum RTP and transferring it to the main equaliser. At the commencement of operation the main equaliser will start with the centre tap reference, because it is considered to be the optimum position of the absence of fading. The slave equaliser will periodically try the N reference tap positions and for each RTP the estimated output MSE will be compared to that obtained with the main equaliser and every time a smaller MSE is obtained with the slave equaliser, the position of the reference tap of the latter as well as its tap-gain values will be transferred to the main equaliser.

It is also known to align the reference tap position with the location in the feedforward filter, which may be embodied as a tapped delay line or a shift register, which contains the last, that is the most recently received, acceptable sample of a current symbol. By an acceptable sample in the present specification is meant a sample which is above the noise floor.

An improved performance of a DFE has been obtained by aligning the reference tap position with the location in the feedforward filter which contains the first acceptable sample, that is the longest held sample, of a current symbol.

It has been found that on occasions the performance of the DFE expressed as SNR versus BER is several dB below the theoretical optimum. Accordingly it is an object of the present invention to improve the performance of a DFE.

SUMMARY OF THE INVENTION

According to a first aspect of the present invention there is provided a method of equalising a data signal which has become distorted by transmission through a dispersive communications channel, including reversing the sequence of the data, applying the data with its sequence reversed to a decision feedback equaliser and reversing the sequence of the decisions produced by the equaliser.

According to a second aspect of the present invention there is provided a signal equalising arrangement comprising first time reversing means having a signal input for receiving successive blocks of data signals and a signal output from which in operation the data signals in each block are read-out in reverse order, recursive filtering means including a decision stage, the filtering means having a signal input for receiving data in a time reversed order and a signal output coupled to the output of the decision stage for producing output signals, and second time reversing means having a signal input coupled to the signal output of the recursive filtering means and a signal output for the equalised data signals.

The present invention is based on the realisation that the performance of a DFE can be improved for a particular preselected reference tap position, that is for example with the reference tap aligned with the peak in the CIR or the first or last sample position in the feedforward filter, by reversing the sequence of the data samples as received.

BRIEF DESCRIPTION OF THE DRAWING

The present invention will now be described, by way of example, with reference to the accompanying drawings, wherein.

In the drawings the same reference numerals have been used to indicate corresponding features.

DETAILED DESCRIPTION OF THE INVENTION

Figure 1:
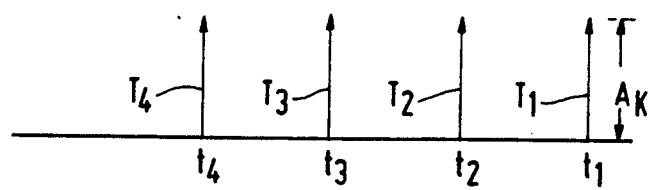
FIG. 1 is a diagram showing a sequence of four data signals T1 to T4.
Figure 2:
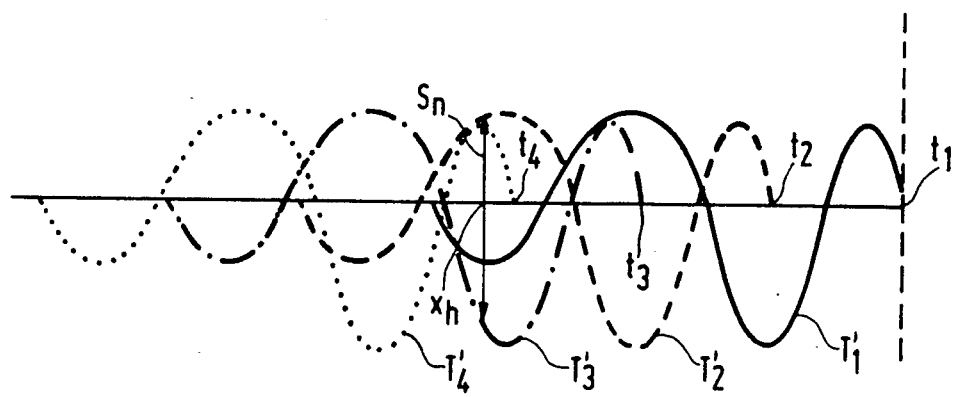
FIG. 2 is a diagram of the data signals which have been distorted by intersymbol interference as a result of transmission through a dispersive channel.
Figure 3:
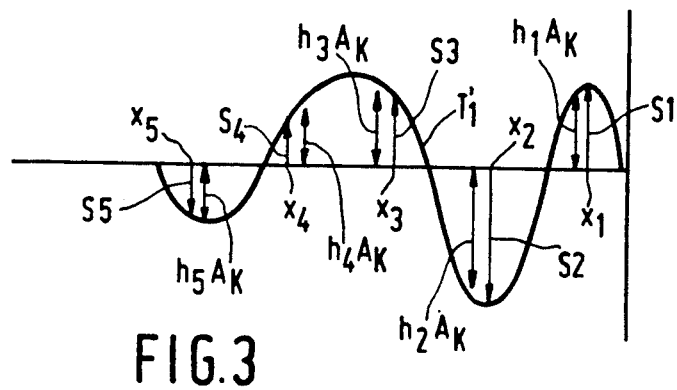
FIG. 3 illustrates an example of a channel impulse response.

Referring to FIGS. 1 to 3, in order to make clear what is meant by a first, a last and a peak sample in a channel impulse response, FIG. 1 assumes that a transmitter transmits symbols in the order T1, T2, T3 and T4 at times $t_1$, $t_2$, $t_3$ and $t_4$ where $t_2$ follows $t_1$ in time and so on. Due to the dispersive nature of the communications channel, the transmitted energy of each symbol becomes smeared with respect to time in accordance with the channel impulse response (CIR) of the communications channel. FIG. 2 shows the situation at the receiver with the smeared symbols $T_1'$, $T_2'$, $T_3'$ and $T_4'$, each symbol commencing at substantially the same instant as the original symbol was transmitted, that is, $t_1$, $t_2$, $t_3$ and $t_4$. The smeared signals are sampled at regular intervals, for example $x_1$, $x_2$, $x_3$, $x_4$ and $x_5$ as shown in FIG. 3 which shows the channel impulse response. Sample S2 is the peak sample and accordingly the first sample S1 precedes it in time and the samples S3 to S5 follow the peak sample in time. In other words as viewed on an oscilloscope screen, the "first sample" S1 will appear at $x_1$ and as sampling of the same symbol takes place at $x_2$ to $x_5$ then the first sample S1 will be displaced rightwards by the second sample S2, and so on until the last sample S5 appears at $x_5$. As successive symbols are transmitted in bursts it will mean that at any one instant at the receiver, for example $x_n$ in FIG. 2 then the sample Sn will be composed of the sum of the energy from symbols $T_4$, $T_3$, $T_2$ and $T_1$ and the DFE has to make a decision as to the value of the sample being transmitted.

Since the signal as received at a receiver is band limited, then the peak value of the channel impulse response will always be preceded by at least the first symbol sample. However it may arise in a radio communications system that at least the first symbol sample as received cannot be distinguished from the noise floor of the received signal in which case that sample has to be ignored and the next sample taken. In an exceptional case the second sample, or first acceptable sample, may be the peak in the channel impulse response.

Figure 4:
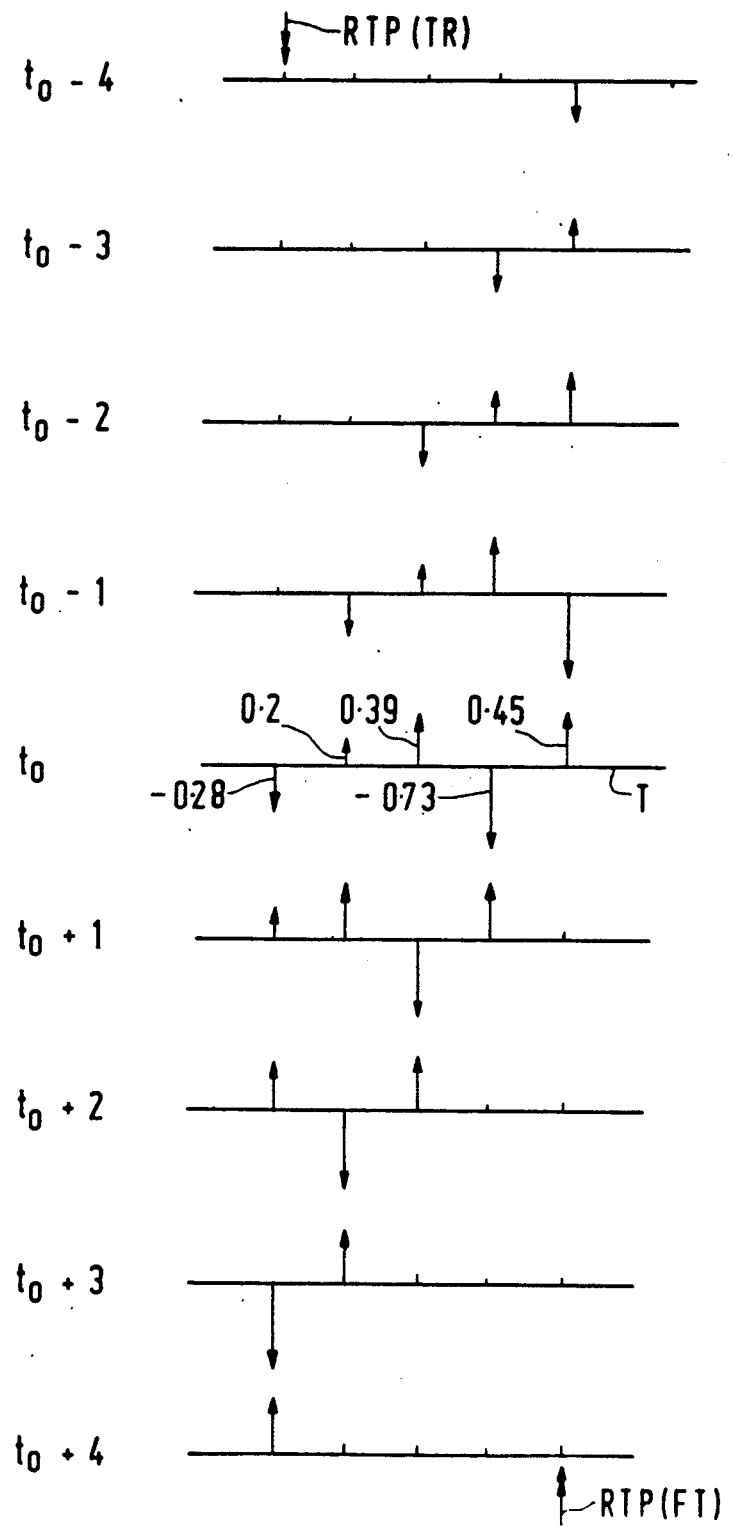
FIG. 4 illustrates the progression of samples of symbols through a tapped delay line having 5 taps.

In FIG. 3 the samples S1 to S5 have amplitudes $h_1 A_K$ to $h_5 A_K$ where $h_1$ to $h_5$ have the relative amplitudes of 0.45, −0.73, 0.39, 0.2 and −0.28, respectively. FIG. 4 illustrates the progression of samples of symbols through a tapped delay line in the situation where a sequence of equally spaced symbols is transmitted at successive intervals $t_0-4$ to $t_0+4$ and where $t_0$ is the current sample and $t_0-4$ to $t_0-1$ are the preceding samples and $t_0+1$ to $t_0+4$ are the following samples. As a result of dispersion in the channel the energy in each symbol is spread so that at any one instant, the receiver is receiving energy which is made up of part of the energy in each of a number of symbols, in this example 5 dispersed symbols. If the symbols are the same then the received energy will be substantially constant. The energy is determined by adding the contributions in a column, that is, the sum of the squares of $0.45 A_K$, $−0.75 A_K 0.39 A_K$, $0.2 A_K$ and $−0.28 A_K$. Assuming that the channel impulse response (CIR) remains constant then it is possible to estimate at any one instant the proportion of each symbol which has contributed to the overall energy.

Figure 5:
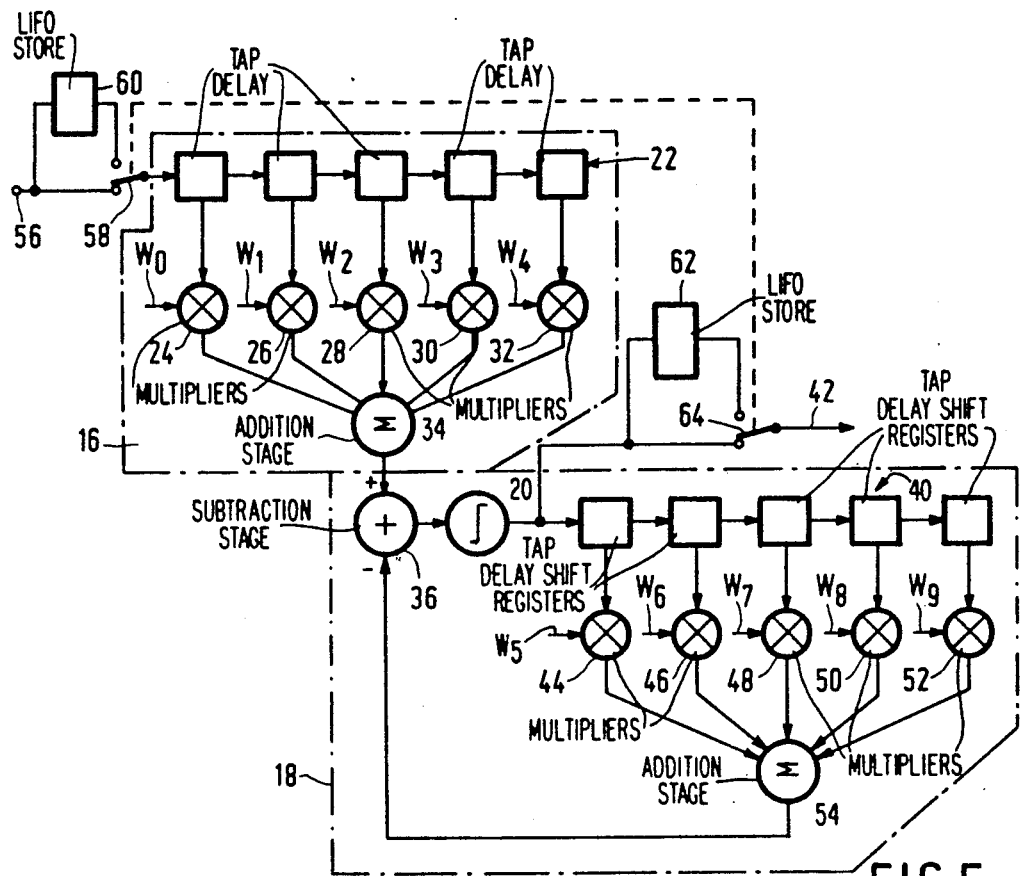
FIG. 5 is a block schematic diagram of one embodiment of a DFE.

FIG. 5 illustrates a decision feedback equaliser (DFE) which can be operated in its normal or forward data mode or in data reversed mode. The DFE comprises a feedforward filter section 16 and a feedback filter section 18 including a decision stage 20. The feedforward filter section 16 comprises a transversal filter formed by a tapped delay line 22. The taps are connected to respective multipliers 24 to 32 in which the signals derived are multiplied by respective weighting coefficients $w_0$ to $w_4$. The multiplier outputs are summed in an addition stage 34 from where the sum signal is supplied to a subtraction stage 36 in the feedback filter section 18. The feedback filter section 18 is essentially a recursive filter. The decision stage 20 is connected between an output of the subtraction stage 36 and an input to another tapped delay line or shift register 40. Decisions made by the stage 20 are derived on an output 42. Outputs from the respective taps of the delay line or stages of the shift register 40 are coupled to respective multipliers 44 to 52 in which the outputs are multiplied by the weighting coefficients $w_5$ to $w_9$. The outputs from the multipliers 44 to 52 are summed in an addition stage 54 whose output is connected to the subtraction stage 36.

The basic operation of the illustrated DFE is known and can be summarised by saying that the feedforward filter section 16 accepts the received input signal samples and produces a weighted sum of these input signal samples. This sum includes energy from the current input and from the preceding and following symbols. The feedback filter section 18 is driven by the preceding data decisions and in so doing cancels the effects of the preceding symbols in the current decision.

The decision stage 20 makes a decision based on the value of the signal at its input at a certain point in time. This is necessary because the energy in the transmitted pulse is dispersed in time and is represented by the channel impulse response (FIG. 3).

The said point in time is determined by the reference tap position (RTP) which serves as a synchronisation marker between the transmitter and the receiver. As mentioned in the preamble of the present specification in those situations where the channel impulse response is substantially constant such as in a telephone system which has a large signal to noise ratio the RTP is selected as being the peak in the channel impulse response. In the illustrated embodiment the RTP will be aligned with the storage location of the tapped delay line containing the sample S2 (FIG. 3). However in a situation of a changing channel impulse response and poor signal to noise ratio, the performance in this case being measured by comparing bit error rate (BER) with the signal to noise ratio (SNR) measured in dB, aligning the RTP with the sample having a peak value will not necessarily produce results approaching the theoretical optimum. In such a situation it has been found preferable to align the RTP to the position at which the first acceptable pulse of a train associated with a symbol is located. Preferably the majority if not all the pulses in the train associated with the symbol are contained in the feedforward filter section 16. If the tapped delay line has a length corresponding to the number of pulses in the channel impulse response, then the first pulse and also the RTP will be at the far end of the feedforward filter section 16. By lining-up the RTP with the location of the first pulse of a symbol then a DFE can achieve a performance close to the theoretical optimum for a variable radio channel as predicted by J. Salz in an article "Optimum Mean-Square Decision Feedback Equalisation" The Bell System Technical Journal, Oct. 1973 pages 1341 to 1373. The tap weights $w_0$ to $w_4$ applied to the multipliers 24 to 32 in the illustrated example are trained dynamically to optimise the signal output of the DFE. In the event of the anticipated number of pulse samples in the channel impulse response being variable, say 5 or 6 pulses, then the tapped delay line 22 is made bigger and the tap weights are trained accordingly for example in the case of there only being 5 pulses in a channel impulse response then the RTP will be at the far end or the penultimate position from the far end, and the tap weight applied to the multiplier at either the near end or the far end, respectively, of the tapped delay line 22 would be very small or zero.

If the equalisation can be performed off-line on stored samples it has been found that operating the equalising process in reverse time may produce performance closer to the theoretical optimum. This is particularly applicable when the channel impulse response is very asymmetric. In order to be able to process the stored samples in reverse time as well as forward time the input section of the DFE shown in FIG. 5 comprises an input terminal 56 connected to one pole of a change-over switch 58 and to a last-in, first-out (LIFO) store 60 connected to a second pole of the switch 58. Thus when the LIFO 60 is connected between the input 56 and the tapped delay line 22, the input signals are applied in a reverse time sequence.

Another LIFO store 62 is connected to the output of the decision stage 20. The output of the decision stage 20 is connected to one pole of a change-over switch 64 and the output of the LIFO 62 is connected to a second pole of the switch 64. The switches 58 and 64 are ganged so that when it is desired to operate in reverse time sequence both LIFO stores 60, 62 are in circuit with the result that although the equalisation is done in a reverse time sequence, the symbols are derived in the proper sequence on the output 42. The LIFO stores 60, 62 have a storage capacity corresponding to all the samples forming a block of data as received.

In operation, blocks of data which have been stored can be processed both in forward time and then in reverse time and the result which is closer to the theoretical optimum on the basis of minimum mean squared error.

It is also known for a DFE to be operated by selecting the RTP to be aligned with the last sample or pulse of a dispersed symbol, that is S5 in FIG. 3. However if the first pulse, that is S1 in FIG. 3, is larger than the last pulse, that is S5, then in general an improved result will be obtained by operating the DFE with the data presented in a reverse sequence.

Figure 6:
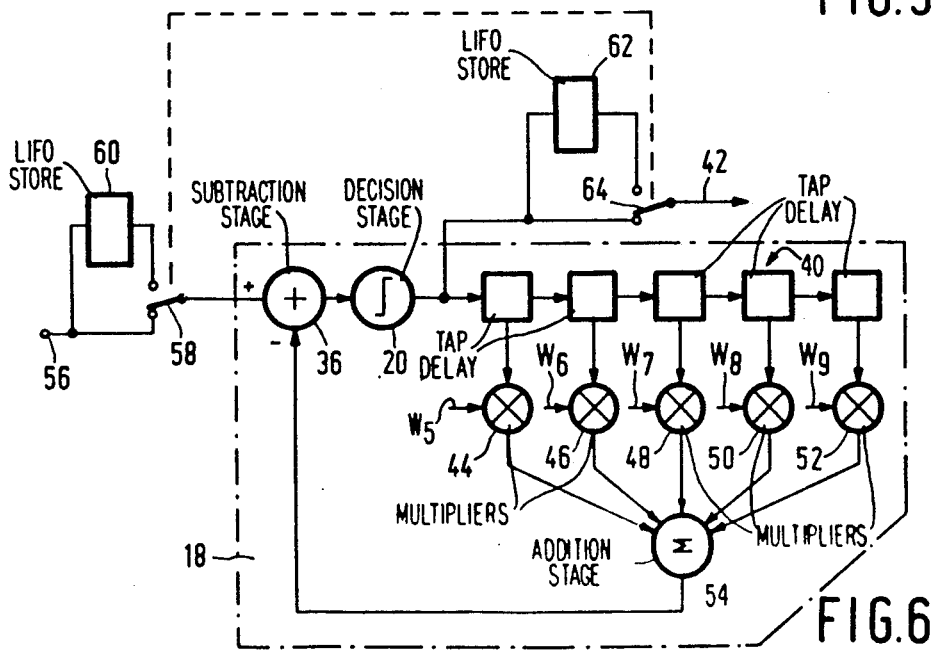
FIG. 6 is a block schematic diagram of another embodiment of a DFE in which the reference tap position is aligned with the last sample in the CIR.

In the event of wishing to operate only on the last sample, then with the DFE shown in FIG. 5, the tap weight $w_0$ can be set to 1 and the tap weights $w_1$ to $w_4$ can be set to zero. The construction of the DFE can then be simplified as shown in FIG. 6. Compared to FIG. 5, the transversal filter 22 forming the feedforward filter section 16 has been omitted and the output of the change-over switch 58 is connected to the subtraction stage 36 in the feedback filter section 18. The tap weights $w_5$ to $w_9$ will have the values of the samples of the CIR preceding the last sample. In the illustrated example as there are only four preceding samples S1 to S4 (FIG. 3) then they will be assigned to $w_8$ to $w_5$, respectively, and $w_9$ will be given a value zero. As with the embodiment shown in FIG. 5, the DFE shown in FIG. 6 can be operated in a forward data mode or in a time reverse data mode as desired.

We claim:

1. A method of equalising a data signal distorted by transmission though a dispersive communications channel, comprising:
   (a) reversing the sequence of the data;
   (b) applying the data with its sequence reversed to a decision feedback equaliser; and
   (c) reversing the sequence of decisions produced by the equaliser.

2. A method as claimed in claim 1, further comprising:
   (a) applying the data as a succession of blocks to a first last in, first out store and;
   (b) applying the decisions to a second last in, first out store.

3. A method as claimed in claim 1 or 2, further comprising:
   (a) coupling a feedforward filter section to a feedback filter section having a decision stage in the decision feedback equaliser; and
   (b) aligning a reference tap position with a storage location containing a peak in the channel impulse response of the communications channel.

4. A method as claimed in claim 3, characterized by optionally processing the sequence of the data in the order it is received from the communications channel.

5. A method as claimed in claim 1 or 2, further comprising:
   (a) coupling a feedforward filter section to a feedback filter section having a decision stage in the decision feedback equaliser; and
   (b) aligning a reference tap position with a storage location containing a first sample of a symbol in the sequence in which it is applied to the feedforward filter section.

6. A method as claimed in claim 5, characterized by optionally processing the sequence of the data in the order it is received from the communications channel.

7. A method as claimed in claim 5, further comprising storing at least a majority of the samples of a symbol in the feedforward section.

8. A method as claimed in claim 7, characterized by optionally processing the sequence of the data in the order it is received from the communications channel.

9. A method as claimed in claim 1 or 2, further comprising:
   (a) coupling a feedforward filter section and a feedback filter section having a decision stage in a decision feedback equaliser; and
   (b) aligning a reference tap position with a storage location containing the last sample of a symbol in the sequence in which it is applied to the feedforward filter section.

10. A method as claimed in claim 9, characterized by optionally processing the sequence of the data in the order it is received from the communications channel.

11. A method as claimed in claims 1 or 2, further comprising optionally processing the sequence of the data in the order it is received from the communications channel.

12. A signal equalising arrangement comprising:
   (a) first sequence reversing means having a signal input for receiving successive blocks of data signals and a signal output from which in operation the data signals in each time block are read-out in reverse order;
   (b) recursive filtering means having a signal input for receiving data in a sequence reversed order, a decision stage, and a signal output coupled to the decision stage for producing output signals; and
   (c) second sequence reversing means having a signal input coupled to the signal output of the recursive filtering means and a signal output for the equalised data signals.

13. An arrangement as claimed in claim 12, further comprising a transversal filter having a signal input connected to a signal output of the first sequence reversing means and a signal output connected to the signal input of the recursive filtering means.

14. An arrangement as claimed in claim 12 of 13, further comprising means for optionally by-passing the signal paths through the first and second sequence reversing means to the signal output.

* * * * *